(12) United States Patent
Koike et al.

(10) Patent No.: US 11,179,853 B2
(45) Date of Patent: Nov. 23, 2021

(54) ROBOT, ROBOT SYSTEM, ROBOT POSITION ADJUSTMENT METHOD

(71) Applicant: KABUSHIKI KAISHA YASKAWA DENKI, Kitakyushu (JP)

(72) Inventors: Haruhiko Koike, Kitakyushu (JP); Koichi Kirihara, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 212 days.

(21) Appl. No.: 16/565,503

(22) Filed: Sep. 10, 2019

(65) Prior Publication Data
US 2020/0101617 A1   Apr. 2, 2020

(30) Foreign Application Priority Data
Sep. 27, 2018   (JP) .............................. JP2018-181888

(51) Int. Cl.
*B25J 9/16* (2006.01)
*B25J 9/00* (2006.01)

(52) U.S. Cl.
CPC .......... *B25J 9/1697* (2013.01); *B25J 9/0093* (2013.01)

(58) Field of Classification Search
CPC combination set(s) only.
See application file for complete search history.

(56) References Cited

U.S. PATENT DOCUMENTS

| 2002/0028157 | A1  | 3/2002  | Takahashi et al. |
| 2015/0100162 | A1* | 4/2015  | Lin ........................ B25J 9/1697 |
|              |     |         | 700/259 |
| 2016/0288339 | A1* | 10/2016 | Akaha ...................... B25J 9/046 |
| 2017/0066133 | A1* | 3/2017  | Ooba ..................... B25J 9/1697 |
| 2017/0297196 | A1* | 10/2017 | Koike ....................... B25J 9/042 |
| 2018/0093380 | A1  | 4/2018  | Yoshida et al. |

FOREIGN PATENT DOCUMENTS

| JP | 11-201753    | 7/1999  |
| JP | 2000-009738  | 1/2000  |
| JP | 2005-249435  | 9/2005  |
| JP | 2016-190296  | 11/2016 |
| JP | 2017-47511   | 3/2017  |
| JP | 2017-189862  | 10/2017 |
| JP | 2018-058142  | 4/2018  |

OTHER PUBLICATIONS

Japanese Office Action for corresponding JP Application No. 2018-181888, dated Jul. 17, 2019 (w/ English machine translation).

* cited by examiner

*Primary Examiner* — Kyle O Logan
(74) *Attorney, Agent, or Firm* — Mori & Ward, LLP

(57) ABSTRACT

A robot includes an arm via which the robot is configured to perform an operation on a workpiece conveyed in a conveyance direction on a conveyor, and a visualizer which is configured to visualize positional deviation of the robot from the conveyor in at least one of a first direction perpendicular to the conveyance direction and a second direction perpendicular to both the conveyance direction and the first direction.

11 Claims, 14 Drawing Sheets

ROBOT, ROBOT SYSTEM, ROBOT POSITION ADJUSTMENT METHOD

CROSS-REFERENCE TO RELATED APPLICATIONS

The present application claims priority under 35 U. S. C. § 119 to Japanese Patent Application No. 2018-181888, filed Sep. 27, 2018. The contents of this application are incorporated herein by reference in their entirety.

BACKGROUND

Technical Field

An embodiment disclosed herein relates to a robot, a robot system, and a robot position adjustment method.

Discussion of the Background

Japanese Patent Application Laid-Open No. 2017-47511 discloses a robot system configured so that a position of an object conveyed by a conveyor is detected and a robot performs an operation on the object based on the detected position. The robot system includes a coordinate system setting apparatus setting a conveyor coordinate system for defining the position of the object on the conveyor.

SUMMARY

According to one aspect of the present invention, a robot includes an arm via which the robot is configured to perform an operation on a workpiece conveyed in a conveyance direction on a conveyor, and a visualizer which is configured to visualize positional deviation of the robot from the conveyor in at least one of a first direction perpendicular to the conveyance direction and a second direction perpendicular to both the conveyance direction and the first direction.

According to another aspect of the present invention, a robot system includes a conveyor configured to convey a workpiece in a conveyance direction, a robot configured to perform an operation on the workpiece conveyed in the conveyance direction, and a visualizer configured to visualize positional deviation of the robot from the conveyor in at least one of a first direction perpendicular to the conveyance direction and a second direction perpendicular to both the conveyance direction and the first direction.

According to further aspect of the present invention, a robot position adjustment method includes providing a robot configured to perform an operation on a workpiece conveyed in a conveyance direction on a conveyor, and visualizing positional deviation of the robot from the conveyor in at least one of a first direction perpendicular to the conveyance direction and a second direction perpendicular to both the conveyance direction and the first direction.

DESCRIPTION OF DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
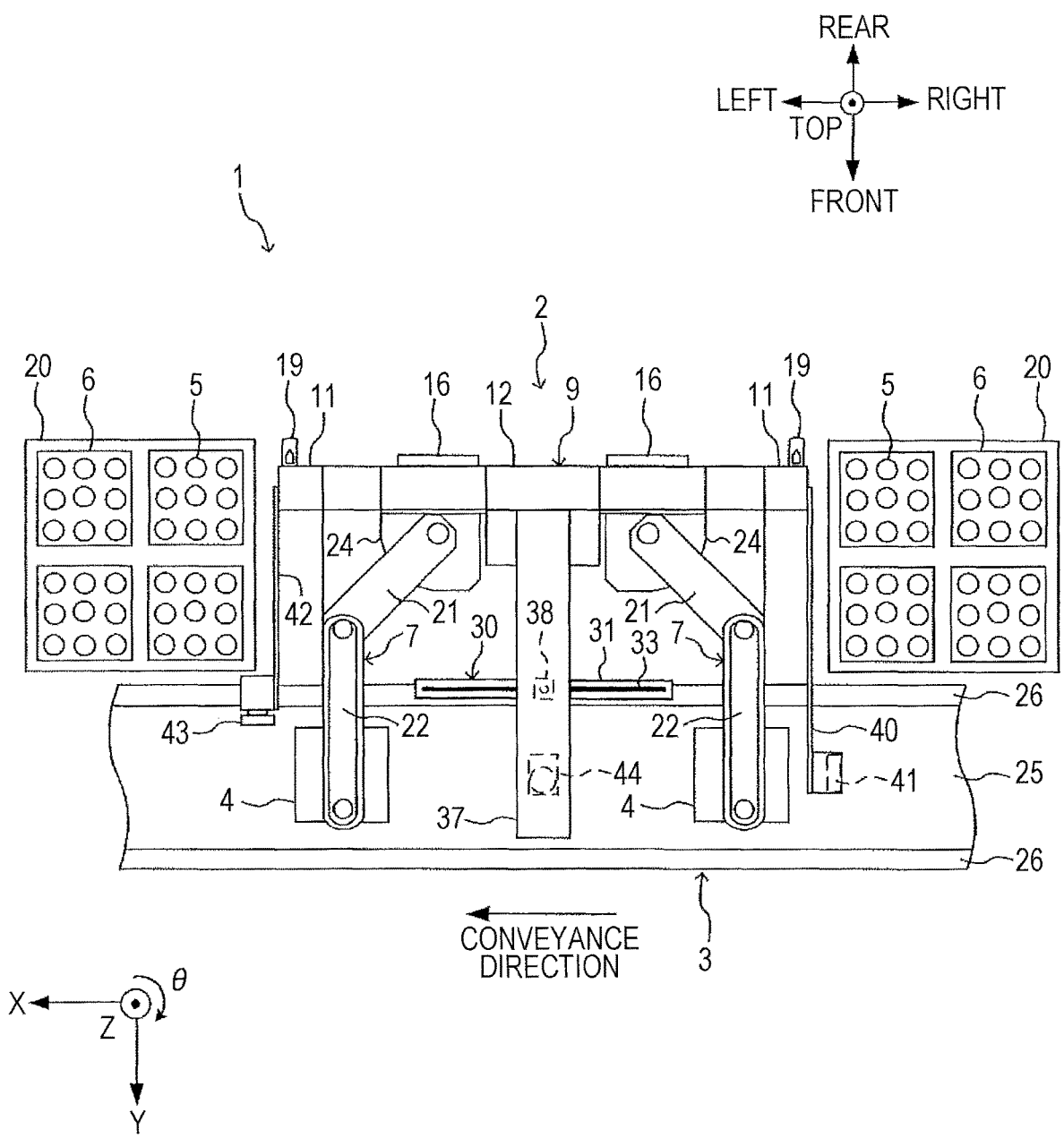
FIG. 1 is a plan view showing an example of configurations of a robot system and a robot according to the present embodiment.

The embodiments will now be described with reference to the accompanying drawings, wherein like reference numerals designate corresponding or identical elements throughout the various drawings.

Hereinafter, an embodiment will be described with reference to the drawings. In the following explanations, the directions of top, bottom, left, right, front, and rear are appropriately used in some cases for convenience in explaining the configurations of a robot and others but that does not limit positional relationship among respective components including a robot and others.

1. Configurations of Robot System and Robot

First, an example of configurations of a robot system 1 and a robot 2 of the present embodiment will be described with reference to FIGS. 1 to 3.

The robot system 1 has the robot 2 and a conveyor 3 and, in the present embodiment, constitutes a food production line. The robot 2 is disposed in the vicinity of the conveyor 3 and performs an operation (an example of a predetermined operation) of serving a food item 5 on a food container 4 (an example of a workpiece) conveyed by the conveyor 3. As shown in FIG. 1, the food item 5 is accommodated in a food supply container 6, and a container 20 (for example, a food tray) accommodating the food supply containers 6 is disposed adjacent to the robot 2.

Figure 2:
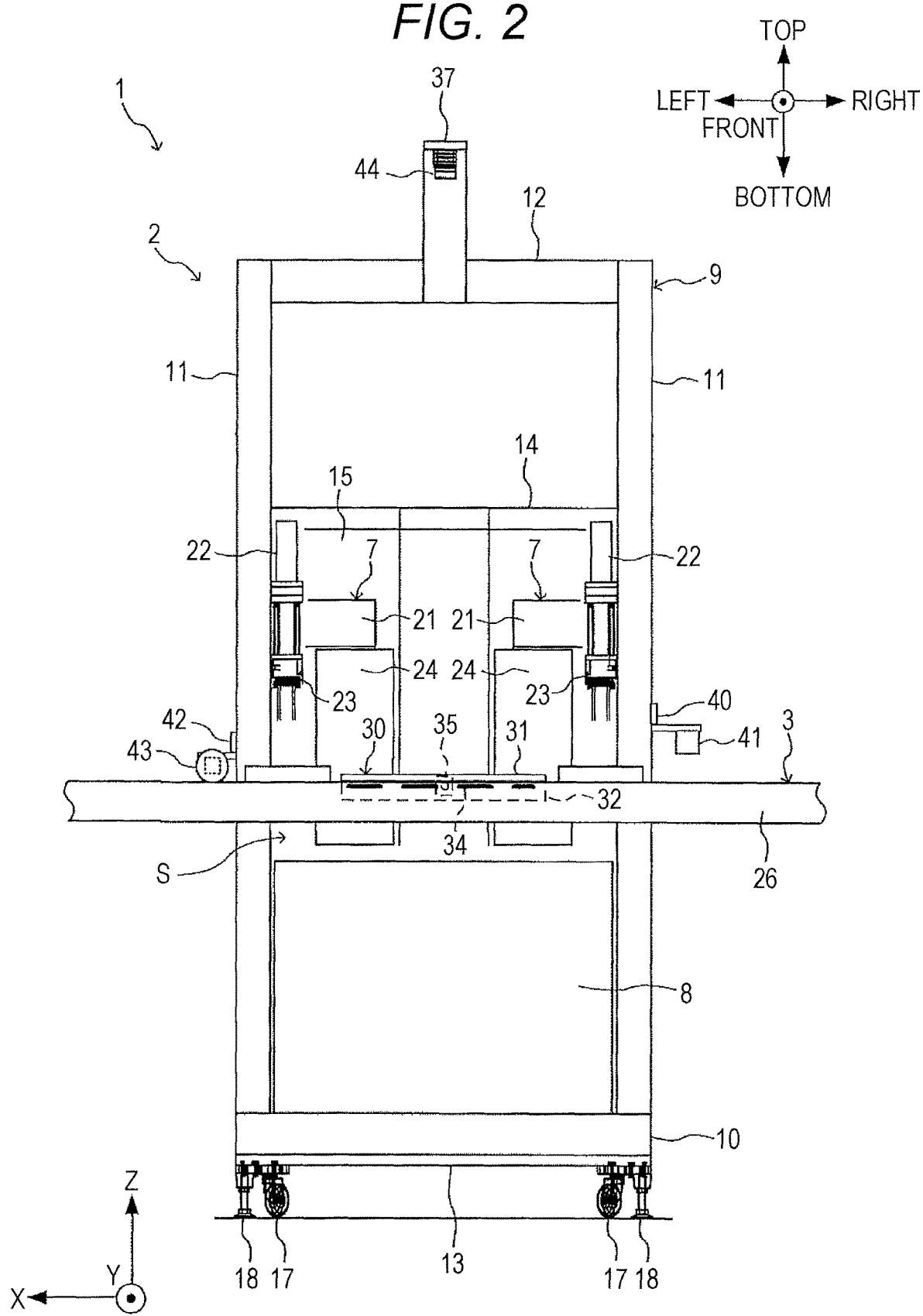
FIG. 2 is a front view showing an example of the configurations of the robot system and the robot according to the present embodiment.
Figure 3:
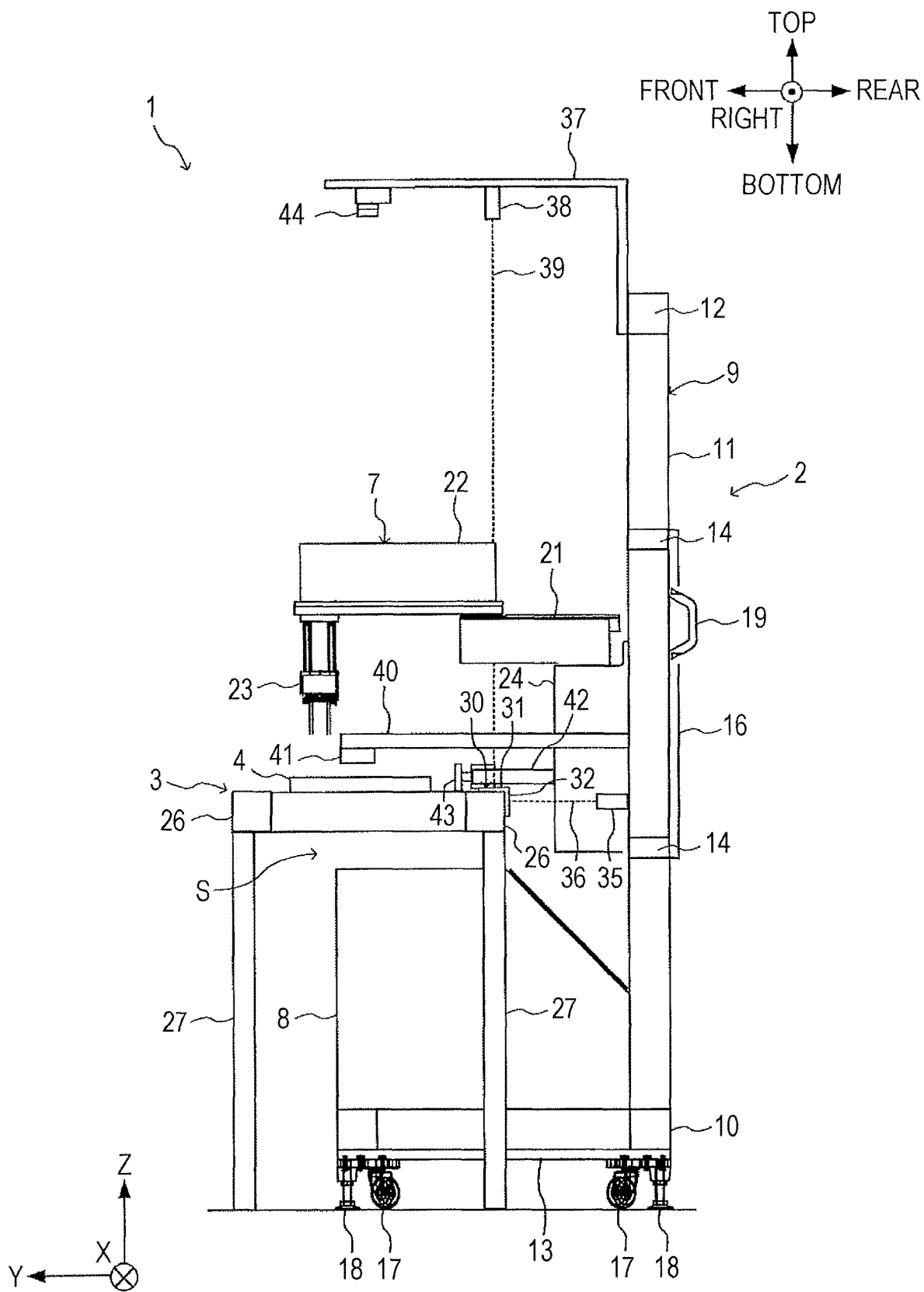
FIG. 3 is a right side view showing an example of the configurations of the robot system and the robot according to the present embodiment.

As shown in FIGS. 1 to 3, the robot 2 is a dual arm robot having two robot arms 7. The two robot arms 7 project on the conveyor 3 so as to be on the upstream side and the downstream side in a conveyance direction, and perform the operation of serving the food item 5 while operating independently.

The robot 2 has the robot arm 7, a control box 8 accommodating a controller (not shown) for controlling the operation of the robot arm 7, and a support frame 9. The support frame 9 supports the control box 8 at the bottom and the robot arm 7 at the top of the control box 8. A gap S is provided between the control box 8 and the robot arm 7, and the robot 2 is disposed such that at least a portion of the conveyor 3 is accommodated in the gap S. The support frame 9 is made of, for example, a square pipe made of a metal material such as aluminum, iron, or SUS, FRP (fiber reinforced plastic), or the like.

The support frame 9 has a substantially rectangular bottom plate frame 10, column frames 11 erected at left and right rear corner portions of the bottom plate frame 10, and a connection frame 12 connecting upper ends of the column frames 11. The control box 8 is installed on the bottom plate frame 10. As a weight member for lowering a center of gravity of the robot 2, a base plate 13 made of, for example, stainless steel is attached to a lower surface of the bottom plate frame 10.

A pair of upper and lower beam frames 14 extending in a left-right direction is provided between the left and right column frames 11, and a back plate 15 (see FIG. 2) is fixed between the pair of beam frames 14. The back plate 15 is provided with a pair of vertical movement mechanisms 16 disposed on the proximal end side of each of the robot arms 7 and moving the robot arms 7 individually in the vertical direction. The vertical movement mechanism 16 has, for example, a ball screw mechanism.

A caster 17 and a level adjuster 18 (an example of an adjuster) are provided at four corners of a lower surface of the base plate 13. The caster 17 is equipped with a wheel for moving the robot 2 to an installation location. The level adjuster 18 installs the moved robot 2 at the installation location and, at the same time, adjusts the vertical position and posture of the robot 2. At the rear of each of the column frames 11, a handle 19 that can be held by an operator when moving the robot 2 is provided. As a result, the operator can move the robot 2 to a desired installation location by pushing the robot 2 using the handle 19 and can install the robot 2.

The robot arm 7 has a plurality of arm members rotatably connected, in this example, a first arm member 21 and a second arm member 22. The robot arm 7 is a horizontal articulated robot arm that causes the first arm member 21 and the second arm member 22 to pivot in a horizontal plane. The first arm member 21 is pivotably connected to the vertical movement mechanism 16 in a substantially horizontal posture. The second arm member 22 is pivotably connected to a tip end of the first arm member 21 in a substantially horizontal posture on the upper side of the first arm member 21.

On a lower surface of a tip end portion of the second arm member 22, a tool 23 for performing a predetermined operation such as gripping of the food item 5 is provided. The type of the tool 23 is not particularly limited, and is, for example, an air hand, an electric hand, or a suction pad. In an arm cover 24, a motor, an actuator, and the like (not shown) for driving the robot arm 7 are accommodated.

The conveyor 3 has a conveying member 25 for conveying the food container 4, a pair of conveyor frames 26 arranged on both sides in the width direction, and leg frames 27 provided at four corners, for example. The conveying member 25 is constituted of, for example, a belt, a roller, and the like. In the present embodiment, for convenience of explanation, a direction in which the food container 4 is conveyed by the conveyor 3 is also referred to as an X direction, the vertical direction is also referred to as a Z direction (an example of a first direction), the width direction of the conveyor 3 perpendicular to the X direction and the Z direction is also referred to as a Y direction (an example of a second direction), and a rotational direction around a Z axis is also referred to as a θ direction.

A reference plate 30 (an example of a reference portion) is attached to one of the conveyor frames 26, in this example, the rear conveyor frame 26 on which the robot 2 is disposed. As shown in FIG. 3, the reference plate 30 has a horizontal plate portion 31 disposed on an upper surface of the conveyor frame 26 and a vertical plate portion 32 disposed on a side surface (rear surface) of the conveyor frame 26. As shown in FIG. 1, on the surface (upper surface) of the horizontal plate portion 31, a straight reference mark 33 is formed in parallel with the X direction. Similarly, as shown in FIG. 2, on the surface (rear surface) of the vertical plate portion 32, a straight reference mark 34 is formed parallel to the X direction.

The reference plate 30 may be attached to both of the pair of conveyor frames 26 so that the robot 2 can be disposed on either side in the width direction of the conveyor 3. The reference plate 30 may be fixedly installed or may be removable. A plurality of reference marks may be formed in parallel or may be formed as an aspect other than a straight line. For example, the reference marks may be formed as a plurality of points or marks spaced in the X direction. Furthermore, the reference mark may be directly formed on the conveyor frame 26, the leg frame 27, or the like. Alternatively, the structure itself of the conveyor 3 (for example, an end face or a corner of the conveyor frame 26 or the leg frame 27) may be used as the reference mark.

As shown in FIG. 2 and FIG. 3, an irradiator 35 (a visualizer, an example of a second irradiator) is installed at a position corresponding to the reference plate 30 on a front surface of the back plate 15 of the robot 2. The irradiator 35 applies visible light 36 parallel to the Y direction toward the front and applies light to the vertical plate portion 32 of the reference plate 30. The visible light 36 is applied so that the projected shape is linear. Hereinafter, linear projection light generated by projecting the visible light 36 onto an object is also referred to as "line light 36". As the irradiator 35, a line marker that applies a linear laser beam is used, for example. Irradiation may be performed such that the projected shape is a shape other than a straight line, for example, a plurality of points or marks spaced in the X direction. When the robot 2 is located at a relative position (including height and inclination with respect to the horizontal) serving as a reference (an example of "a first reference position") relative to the conveyor 3 in the Z direction, the reference mark 34 of the vertical plate portion 32 coincides with the line light 36. That is, due to deviation between the reference mark 34 and the line light 36, positional deviation of the robot 2 in the Z direction from the relative position serving as the reference with respect to the conveyor 3 is visualized.

A substantially L-shaped frame 37 projecting upward and forward from a substantially central portion of the connection frame 12 is provided at an upper portion of the robot 2. As shown in FIG. 1 and FIG. 3, an irradiator 38 (a visualizer, an example of a first irradiator) is installed at a position corresponding to the reference plate 30 on a lower surface of the frame 37 of the robot 2. The irradiator 38 applies visible light 39 parallel to the Z direction toward the bottom and applies light to the horizontal plate portion 31 of the reference plate 30. The visible light 39 is applied so that the projected shape is linear. Hereinafter, linear projection light generated by projecting the visible light 39 onto an object is also referred to as "line light 39". As the irradiator 38, a line marker that applies a linear laser beam is used, for example. Irradiation may be performed such that the projected shape is a shape other than a straight line, for example, a plurality of points or marks spaced in the X direction. When the robot 2 is located at a relative position (including a distance between the robot 2 and the conveyor 3 and inclination in the θ direction) as a reference an example of "a second reference position") relative to the conveyor 3 in the Y direction, the reference mark 33 of the horizontal plate portion 31 coincides with the line light 39. That is, due to deviation between the reference mark 33 and the line light 39, positional deviation of the robot 2 in the Y direction from the relative position serving as the reference with respect to the conveyor 3 is visualized.

A workpiece detection sensor 41 is installed on the right column frame 11 of the robot 2 via a support member 40. The workpiece detection sensor 41 detects a position of the food container 4 conveyed by the conveyor 3 on the upstream side in the conveyance direction with respect to an area where the food serving operation is performed by the robot arm 7. On the other hand, a conveyor speed measuring device 43 is installed on the left column frame 11 of the robot 2 via a support member 42. The conveyor speed measuring device 43 measures the conveying speed of the conveyor 3 from a rotational speed of a rotating member in contact with the conveying member 25 and detects a position coordinate of the food container 4 in the conveyance direction. On the lower surface of the frame 37 at the upper portion of the robot 2, a workpiece detection camera 44 is installed at a position corresponding to the conveying member 25 of the conveyor 3. The workpiece detection camera 44 captures an image of the area where the food serving operation is performed by the robot arm 7 and detects position coordinates of the food container 4 and the food item 5 individually.

Since position information of the food container 4 in the X direction can be acquired by the workpiece detection sensor 41, the conveyor speed measuring device 43, and the workpiece detection camera 44, position adjustment of the robot 2 with respect to the conveyor 3 may be performed only in the Y direction and the Z direction.

The configuration of the robot 2 described above is an example, and the form of a robot is not be specifically limited, as long as the robot is a movable robot. For example, the robot 2 may be a single arm robot instead of a dual arm robot. The robot 2 is not limited to the horizontal articulated type (scalar type), and may be of another type such as a parallel link type, a linear motion type, or a vertical articulated type. Alternatively, for example, a dedicated work machine or the like specially designed for a specific work and provided with an actuator movable in at least one of the XYZθ directions may be used.

2. Robot Position Adjustment Method

Figure 4:
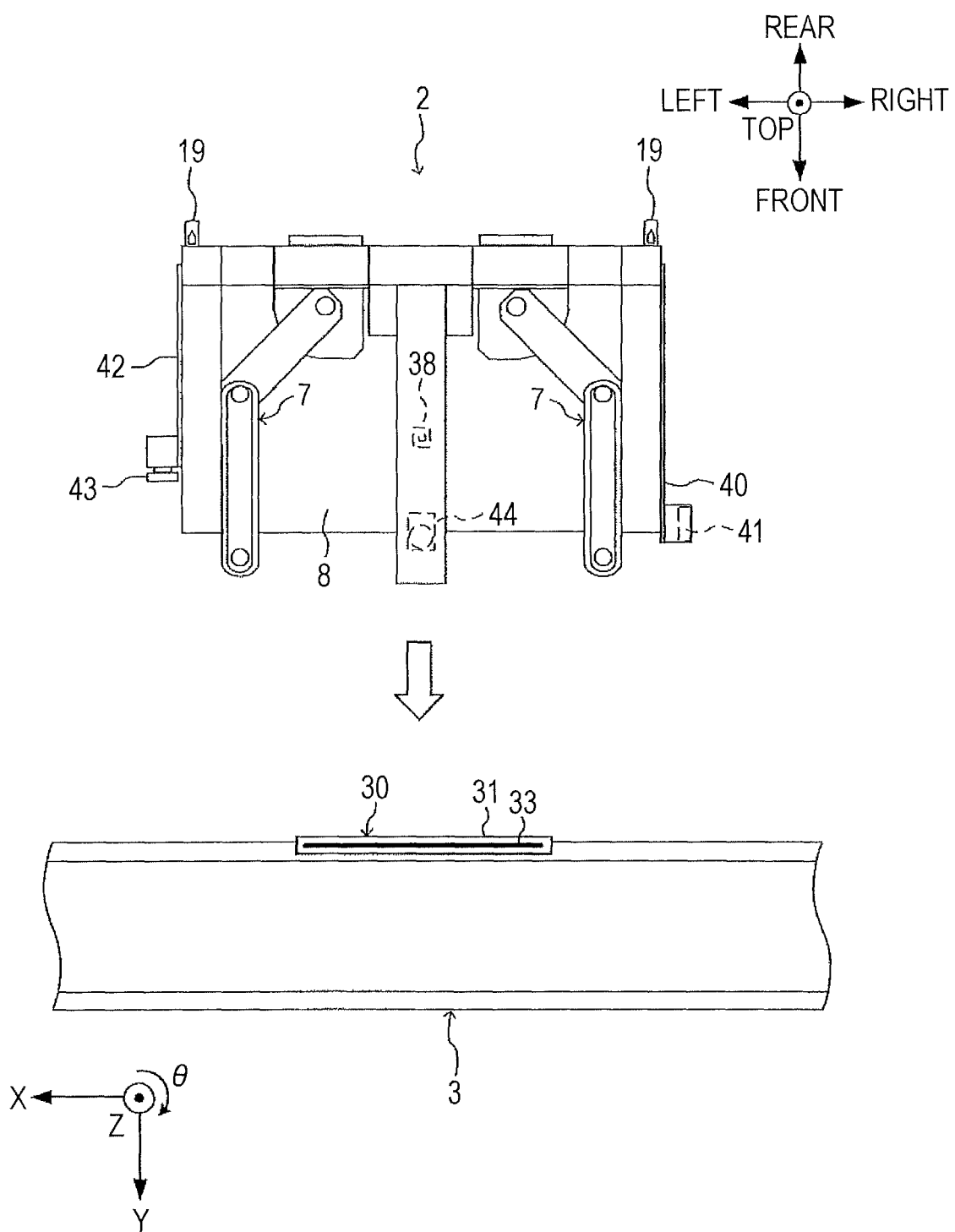
FIG. 4 is an explanatory view for explaining an example of a method of adjusting a position of the robot in a Y direction with respect to a conveyor.
Figure 5:
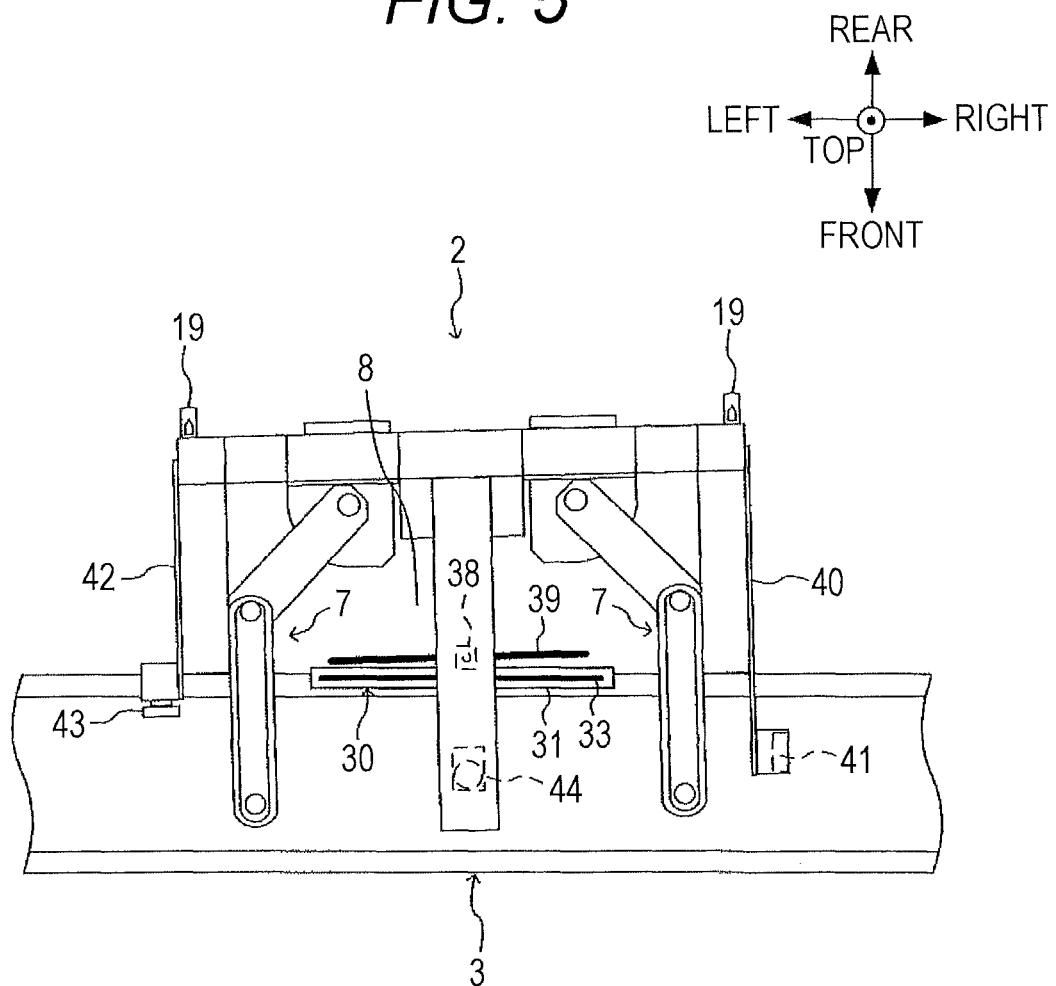
FIG. 5 is an explanatory view for explaining an example of the method of adjusting the position of the robot in the Y direction with respect to the conveyor.
Figure 6:
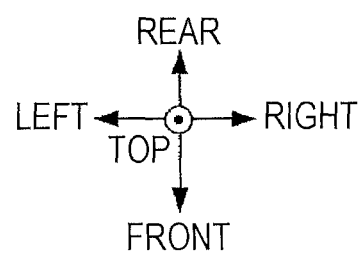
FIG. 6 is an explanatory view for explaining an example of the method of adjusting the position of the robot in the Y direction with respect to the conveyor.
Figure 6:
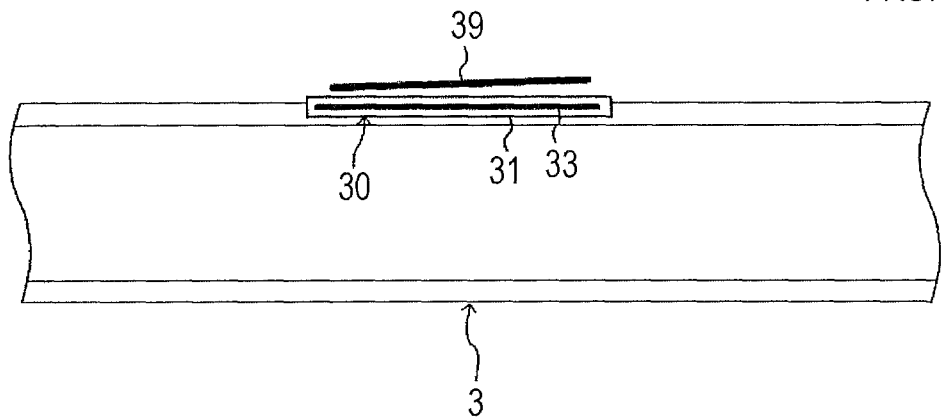
Figure 6:
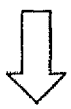
Figure 6:
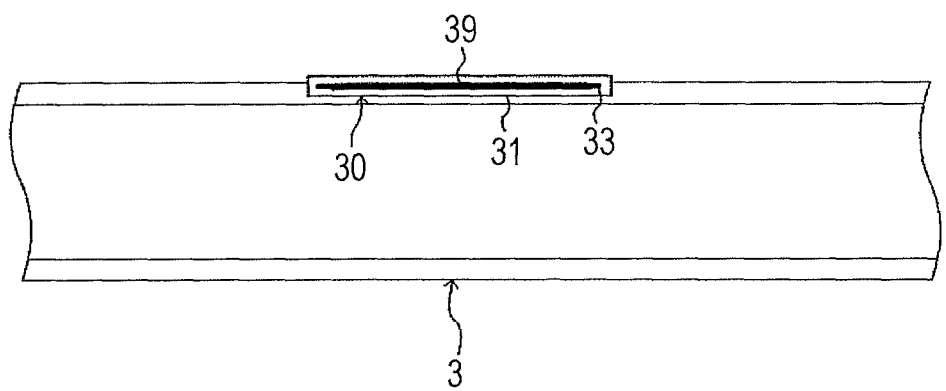
Figure 6:
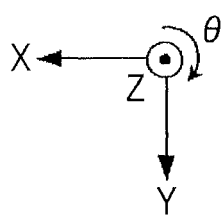
Figure 9:
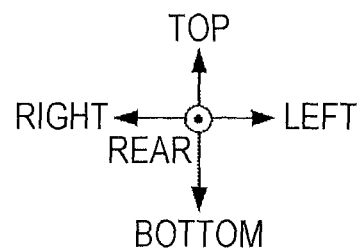
FIG. 9 is an explanatory view for explaining an example of the method of adjusting the position of the robot in the Z direction with respect to the conveyor.
Figure 9:
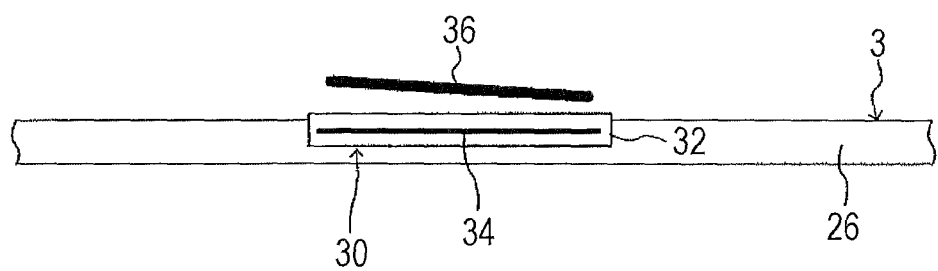
Figure 9:
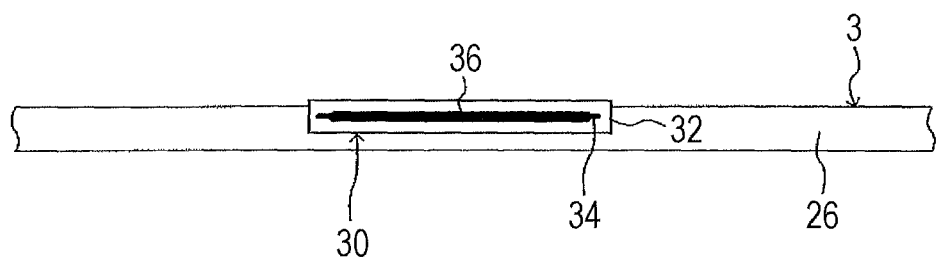
Figure 9:
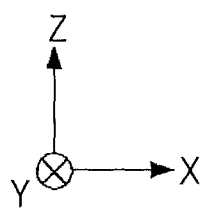

Next, an example of a method of adjusting the position of the robot 2 with respect to the conveyor 3 will be described with reference to FIGS. 4 to 10. In FIG. 6 and FIG. 9, illustration of the robot 2 and the like is omitted to facilitate the description.

First, irradiation by the irradiators 35 and 38 is started in advance. Next, as shown in FIG. 4, an operator holds the handle 19 of the robot 2 and moves the robot 2 to the vicinity of the conveyor 3 using the caster 17. The term "vicinity" means, for example, a position at which at least a portion of the conveyor 3 is accommodated in the gap S between the control box 8 and the robot arm 7. As shown in FIG. 5, the robot 2 is roughly positioned with respect to the conveyor 3, and temporary positioning is performed to the installation location. For example, in the example shown in FIG. 5, the line light 39 from the irradiator 38 is displaced rearward with respect to the reference mark 33 of the horizontal plate portion 31 of the reference plate 30 and is inclined in the θ direction. The line light 39 in this case is projected on, for example, the upper surface or floor surface of the control box 8. In this manner, the positional deviation of the robot 2 in the Y direction from the relative position serving as the reference with respect to the conveyor 3 is visualized.

Figure 7:
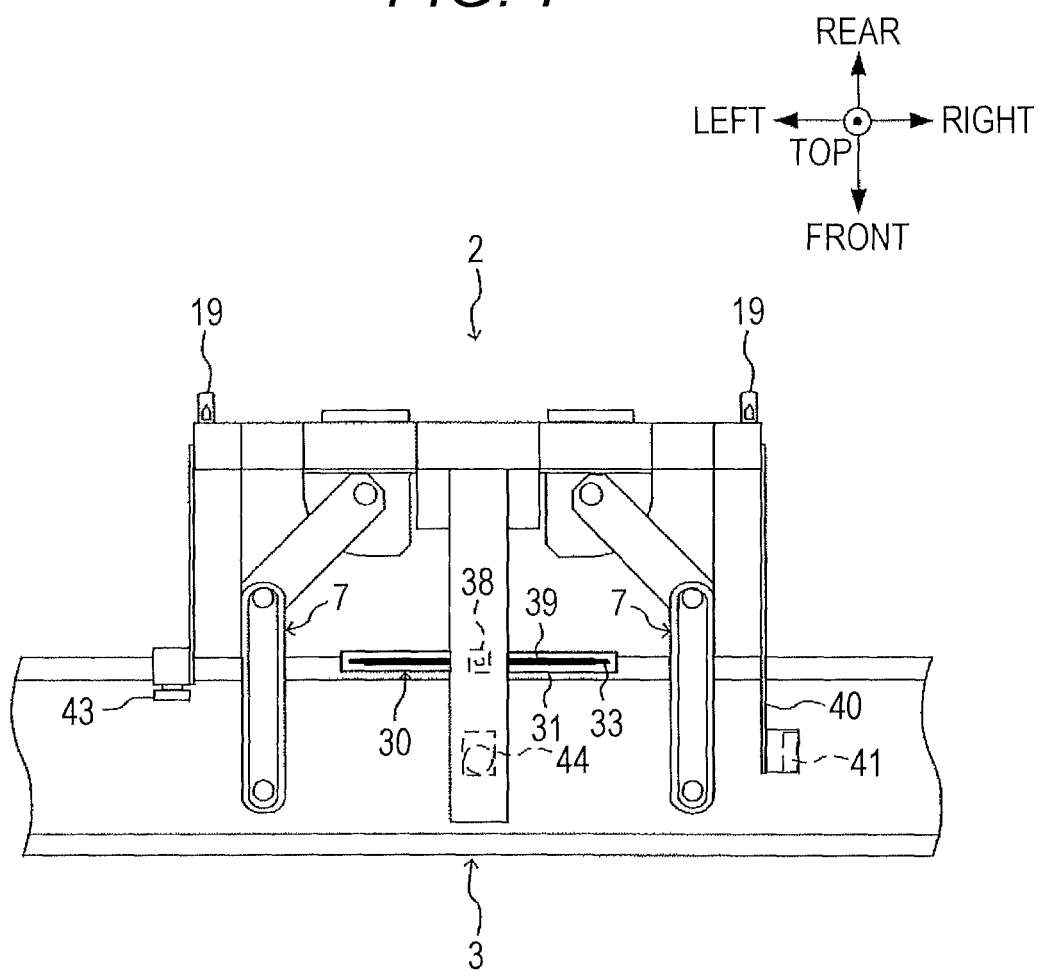
FIG. 7 is an explanatory view for explaining an example of the method of adjusting the position of the robot in the Y direction with respect to the conveyor.
Figure 7:
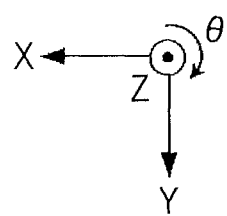
Figure 8:
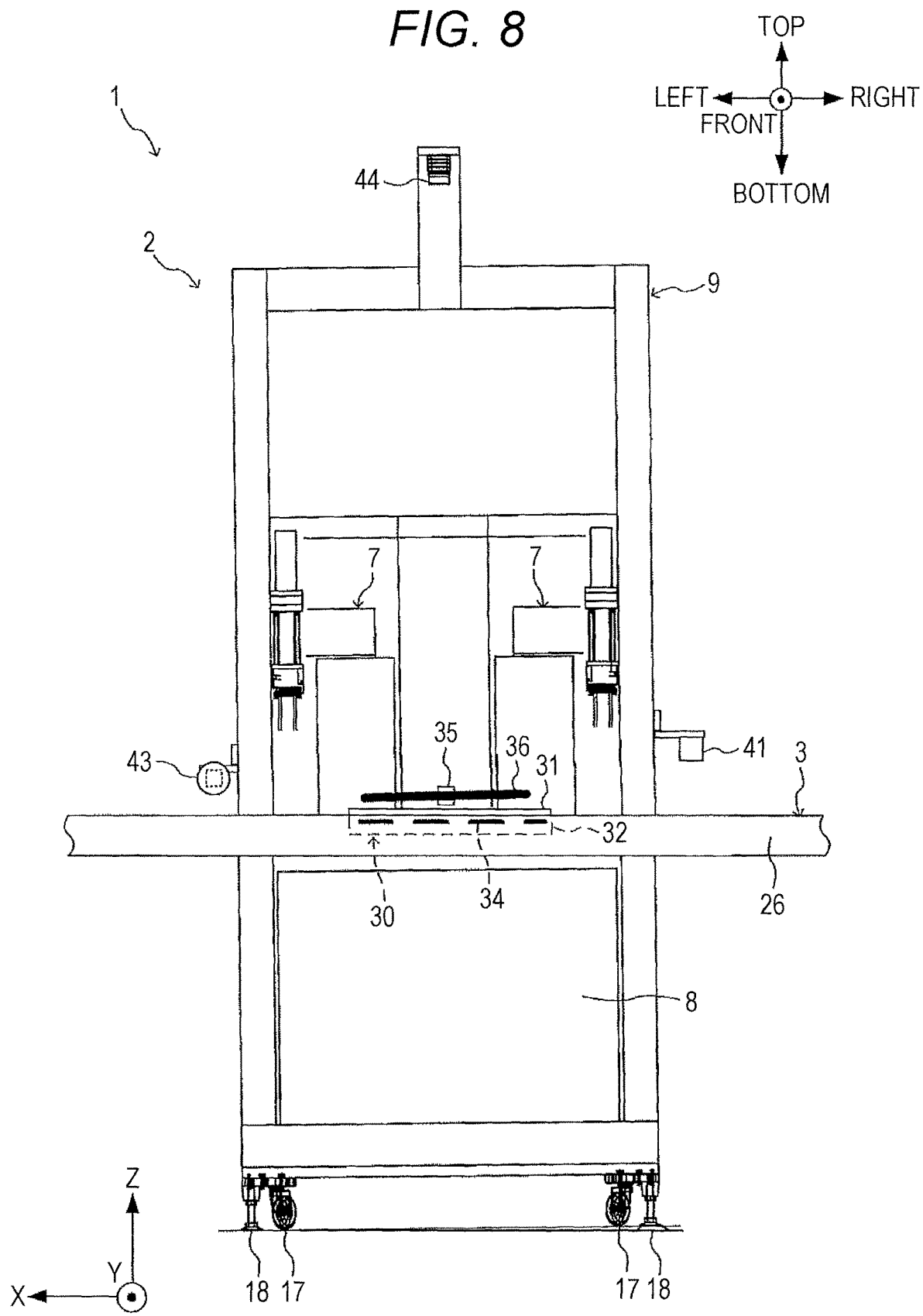
FIG. 8 is an explanatory view for explaining an example of a method of adjusting a position of the robot in a Z direction with respect to the conveyor.

Next, as shown in FIG. 6, the operator moves the robot 2 so that the line light 39 coincides with the reference mark 33 and finely adjusts the distance (interval) between the robot 2 and the conveyor 3 and the inclination in the θ direction of the robot 2. After the adjustment is completed, the operator operates the four level adjusters 18 at a lower portion of the robot 2 to install the robot 2 on the floor and thus to fix the robot 2 so that the robot 2 does not move. Consequently, as shown in FIG. 7, adjustment of the position of the robot 2 in the Y direction with respect to the conveyor 3 is completed.

Next, adjustment of the position of the robot 2 in the Z direction with respect to the conveyor 3 is performed. For example, in the example shown in FIG. 8, the line light 36 from the irradiator 35 is displaced upward with respect to the reference mark 34 of the vertical plate portion 32 of the reference plate 30 and is inclined in the horizontal direction. The line light 36 in this case is projected, for example, on a wall surface and equipment (not shown) on the front side of the conveyor 3. In this manner, the positional deviation of the robot 2 in the Z direction from the relative position serving as the reference with respect to the conveyor 3 is visualized.

Figure 10:
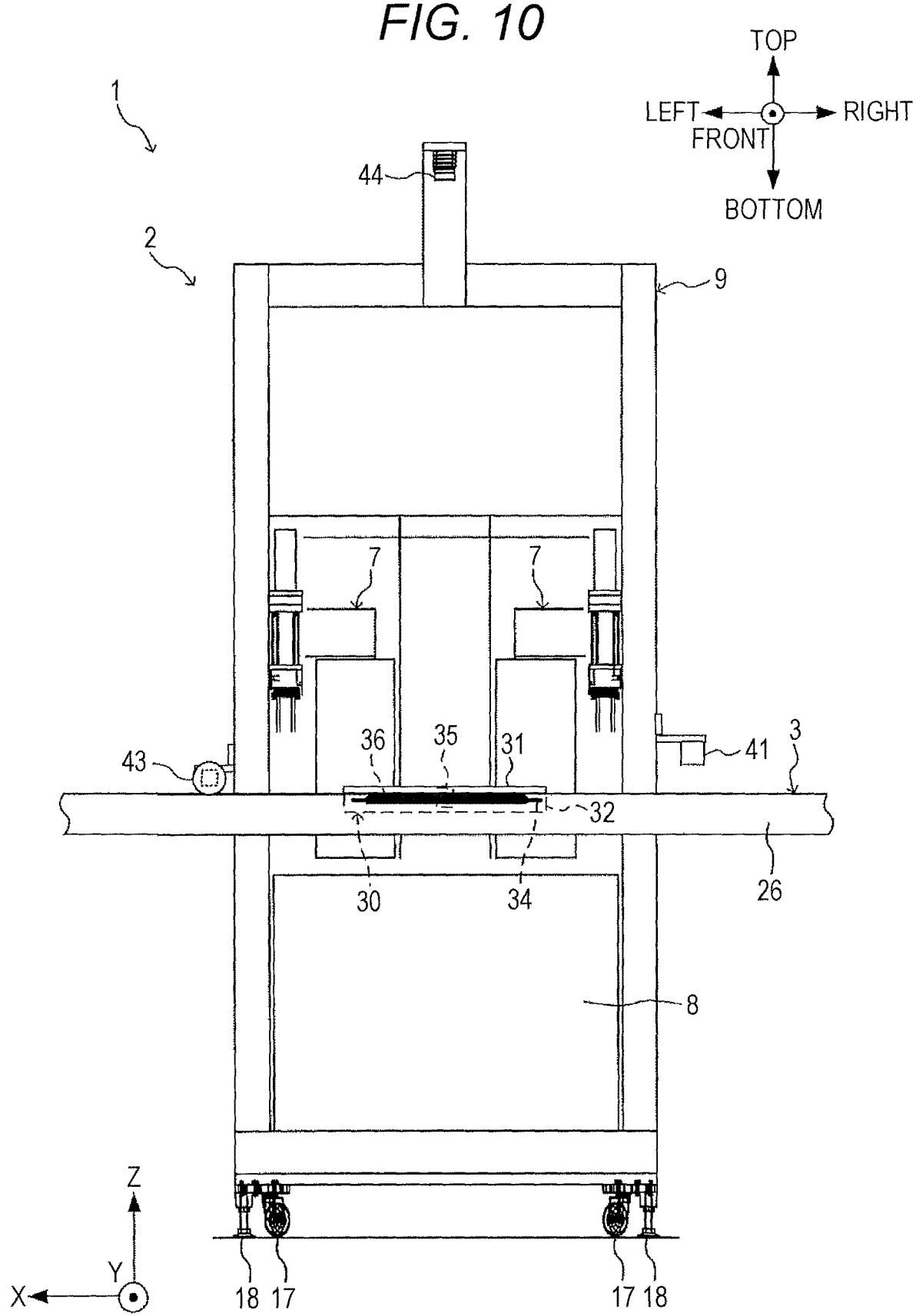
FIG. 10 is an explanatory view for explaining an example of the method of adjusting the position of the robot in the Z direction with respect to the conveyor.

Then, as shown in FIG. 9, the operator operates the four level adjusters 18 and finely adjusts the height of the robot 2 relative to the conveyor 3 and the inclination of the robot 2 with respect to the horizontal direction so that the line light 36 coincides with the reference mark 34. FIG. 9 shows the line light 36 and the reference plate 30 viewed from the rear side. Consequently, as shown in FIG. 10, adjustment of the position of the robot 2 in the Z direction with respect to the conveyor 3 is completed.

As described above, by adjusting the position of the robot 2 using the irradiators 35 and 38, in the robot 2, the robot arm 7, the various sensors 41, 43, and 44, and so on are also positioned relative to the conveyor 3 because these devices are integrated with the irradiators 35 and 38. Therefore, if only a first teaching operation for the conveyor 3 is performed, the teaching operation for the second time becomes unnecessary when reinstalling the robot 2 on the conveyor 3, and the production line can be operated as it is after the above-described position adjustment is completed.

As described above, since the operator performs position adjustment by visual observation, positioning accuracy is in millimeters (mm), for example. However, this level of positioning accuracy is sufficient for food production lines and the like. In addition, since changes in production items and production processes are often made in a short time, the application of the present invention is particularly effective.

In the above case, although the position adjustment in the Z direction is performed after the position adjustment in the Y direction, the position adjustment in the Y direction may be performed after the position adjustment in the Z direction.

3. Effects of the Present Embodiment

As described above, in the robot 2 of the present embodiment, the irradiators 35 and 38 visualize the positional deviation of the robot 2 from the relative position serving as the reference with respect to the conveyor 3. Therefore, the operator can easily adjust the position of the robot 2 with respect to the conveyor 3 by visual observation while confirming the positional deviation in the Y direction and the Z direction. Thus, even when a change in production line or the like is performed, the robot 2 can be easily reinstalled and operated without performing specialized and difficult adjustment operation and setting operation. Therefore, flexibility of the production line can be improved, and, at the same time, the robot system can be more easily introduced to the production line, so that automation of the production line can be promoted.

In the present embodiment, in particular, the robot 2 further has the caster 17 that enables the robot 2 to move, and a handle 19 that can be held by the operator, and the irradiators 35 and 38 visualize the positional deviation when the robot 2 is moved to the vicinity of the conveyor 3. As a result, the operator can move the robot 2 to any installation location in the production line using the handle 19 and can install the robot 2. Therefore, since the operation in the production line performed by the operator can be easily replaced with the operation by the robot 2, automation of the production line can be promoted.

In the present embodiment, in particular, the irradiators 35 and 38 for applying visible light to the reference portion of the conveyor 3 are provided as the visualizer. As a result, the operator can easily visually confirm the positional deviation of the robot 2 from the relative position serving as the reference with respect to the conveyor 3 based on a positional relationship between the reference portion of the conveyor 3 and the irradiated visible light 36 and the irradiated visible light 39. Therefore, the position of the robot 2 with respect to the conveyor 3 can be adjusted easily. Since the irradiators 35 and 38 for applying visible light are generally inexpensive and easy, the design can be simplified, and, at the same time, the cost can be reduced.

In the present embodiment, in particular, the irradiators 35 and 38 apply the line light 36 and the line light 39 having a linear projected shape to the reference portion of the conveyor 3. Since the line light 36 and the line light 39 are emitted, comparison with the reference portion of the conveyor 3 becomes easy because straight lines are compared with each other, and the distance and positional deviation such as inclination can be easily visually confirmed. Therefore, the position of the robot 2 with respect to the conveyor 3 can be adjusted easily.

In the present embodiment, in particular, the irradiators 35 and 38 apply the line light 36 and the line light 39 to the reference marks 34 and 33 of the reference plate 30 attached to the conveyor 3. By setting the reference portion of the conveyor 3 as the reference plate 30 as a separate member, for example, the attachment position of the reference plate 30 can be changed according to the installation location of the robot 2 as a detachable configuration, and the reference plate 30 can be diverted between the plurality of conveyors 3.

In the present embodiment, in particular, the robot 2 has the irradiator 38 that applies visible light in the Z direction and the irradiator 35 that applies visible light in the Y direction. The operator can visually confirm the positional deviation of the robot 2 in the Y direction from the relative position serving as the reference with respect to the conveyor 3 based on a positional relationship between the reference plate 30 of the conveyor 3 and the line light 39 applied from the irradiator 38. In addition, the operator can visually confirm the positional deviation of the robot 2 in the Z direction from the relative position serving as the reference with respect to the conveyor 3 based on a positional relationship between the reference plate 30 of the conveyor 3 and the line light 36 applied from the irradiator 35. Therefore, accurate position adjustment can be performed in both the Y direction and the Z direction.

In the present embodiment, in particular, the robot 2 further has the level adjuster 18 capable of adjusting the position in the Z direction. Consequently, the operator can easily adjust the position (height and inclination) of the robot 2 in the Z direction with respect to the conveyor 3 using the level adjuster 18. By using the inexpensive and easy level adjuster 18 for the position adjustment of the robot 2 in the Z direction, the design can be simplified and, at the same time, the cost can be reduced.

4. Modified Examples

The disclosed embodiment is not limited to that described above, but may be modified in various forms so long as it does not deviate from the scope and the technical concept. Such modified examples will be described below.

4-1. Other Examples of the Visualizer

In the above embodiment, as the visualizer configured to visualize the positional deviation of the robot 2 from the relative position serving as the reference with respect to the conveyor 3, the case of using the irradiator for applying visible light has been described as an example; however, other devices may be used.

Figure 11:
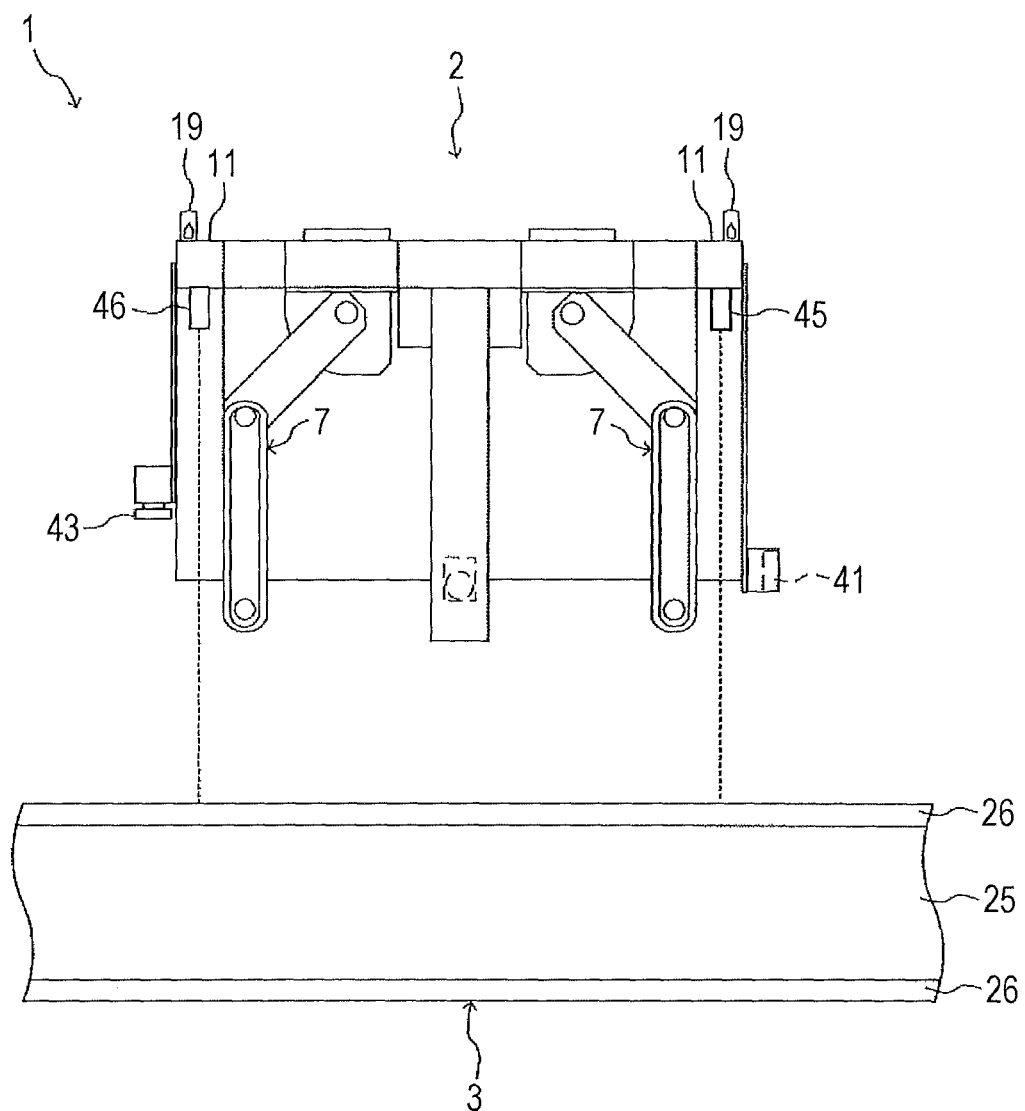
FIG. 11 is a plan view showing an example of the configurations of the robot system and the robot showing another example of a visualizer.

For example, as shown in FIG. 11, distance sensors 45 and 46 (an example of the visualizer) that detect a horizontal distance (interval) from the conveyor frame 26 of the conveyor 3 may be provided on the front surfaces of the left and right column frames 11. Although the type of distance sensor is not specifically limited, an infrared sensor or an ultrasonic sensor can be used, for example. The detection results of the distance sensors 45 and 46 may be displayed, for example, on a display of the sensor itself, or may be displayed on a touch panel (not shown) of the robot 2 or the like. In addition, in the detection result, a distance may be displayed as a numerical value. Alternatively, when a prescribed distance is reached, the detection result may be displayed by changing color or the like. Consequently, the positional deviation of the robot 2 in the Y direction from the relative position serving as the reference with respect to the conveyor 3 is visualized. The operator moves the robot 2 so that the detection values of the distance sensors 45 and 46 become the prescribed distance and finely adjusts the distance (interval) between the robot 2 and the conveyor 3 and the inclination in the θ direction of the robot 2. Consequently, the position of the robot 2 in the Y direction with respect to the conveyor 3 can be adjusted.

Figure 12:
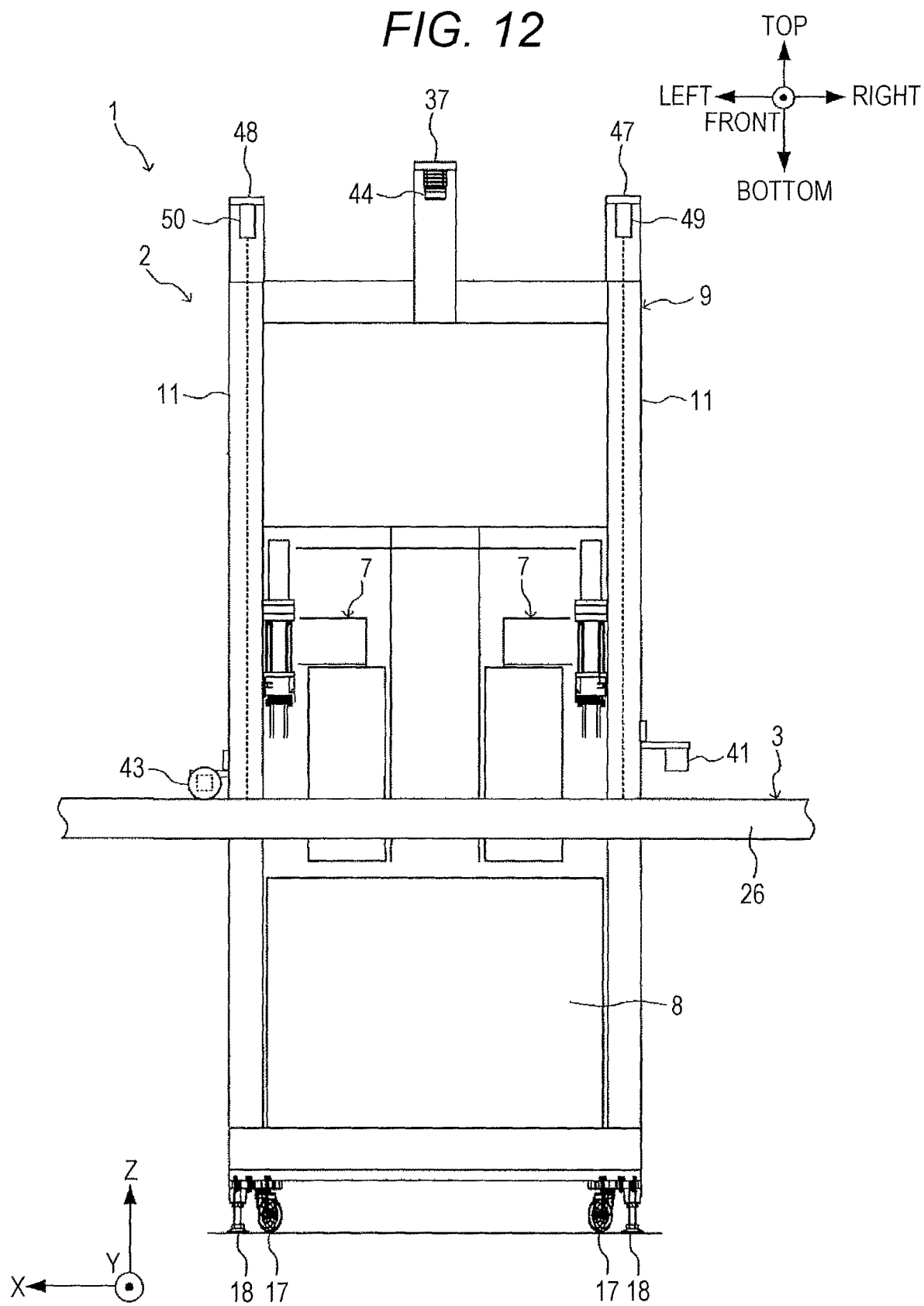
FIG. 12 is a front view showing an example of the configurations of the robot system and the robot showing another example of the visualizer.

Similarly, for example, as shown in FIG. 12, on the upper side of the left and right column frames 11, frames 47 and 48 having the same shape as, for example, the frame 37 and projecting forward may be provided. In addition, distance sensors 49 and 50 (an example of the visualizer) that detect a distance (interval) in the height direction from the conveyor frame 26 of the conveyor 3 may be provided on the respective lower surfaces of the frames 47 and 48. Although the type of distance sensor is not specifically limited, an infrared sensor or an ultrasonic sensor can be used, for example. The detection results of the distance sensors 49 and 50 may be displayed, for example, on a display of the sensor itself, or may be displayed on the touch panel (not shown) of the robot 2 or the like. In addition, in the detection result, a distance may be displayed as a numerical value. Alternatively, when a prescribed distance is reached, the detection result may be displayed by changing color or the like. Consequently, the positional deviation of the robot 2 in the Z direction from the relative position serving as the reference with respect to the conveyor 3 is visualized. The operator operates the level adjuster 18 so that the detection values of the distance sensors 49 and 50 become the prescribed distance and finely adjusts the height of the robot 2 and the inclination of the robot 2 with respect to the horizontal direction. Consequently, the position of the robot 2 in the Z direction with respect to the conveyor 3 can be adjusted.

Figure 13:
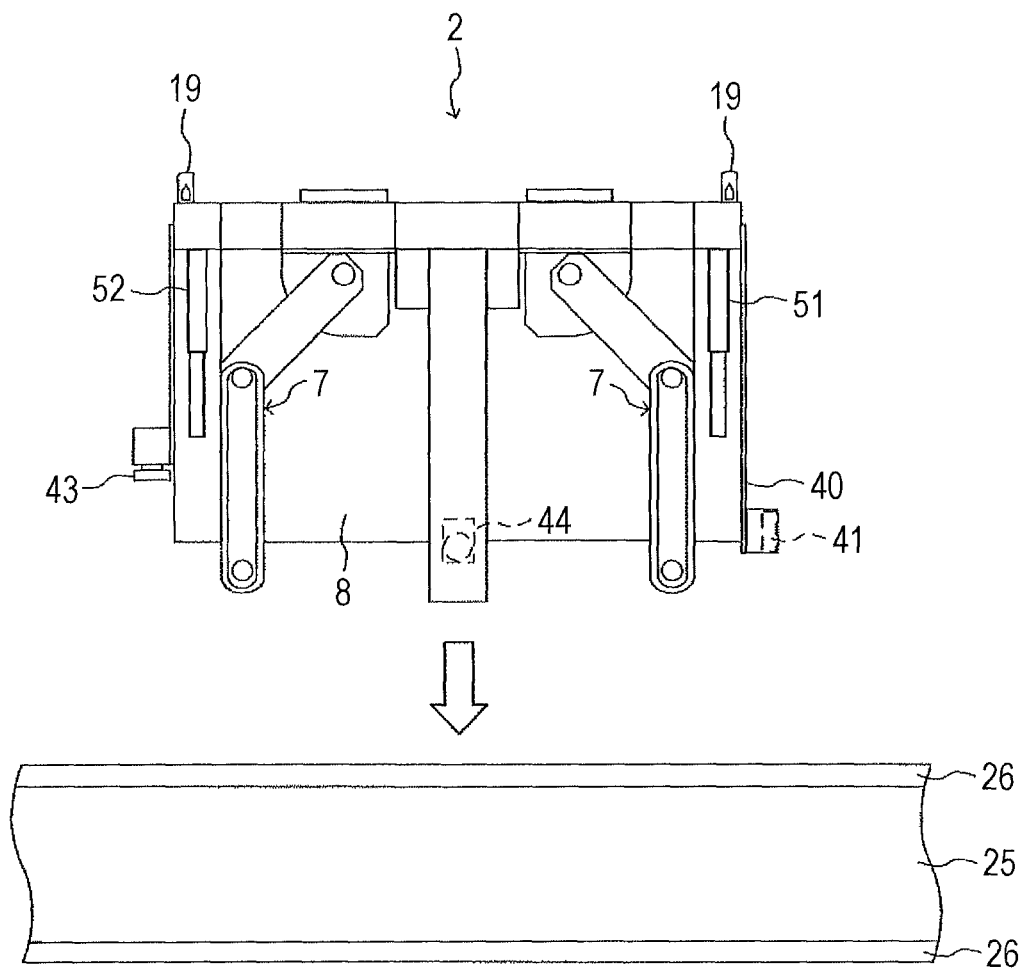
FIG. 13 is a plan view showing an example of the configurations of the robot system and the robot showing still another example of the visualizer.
Figure 14:
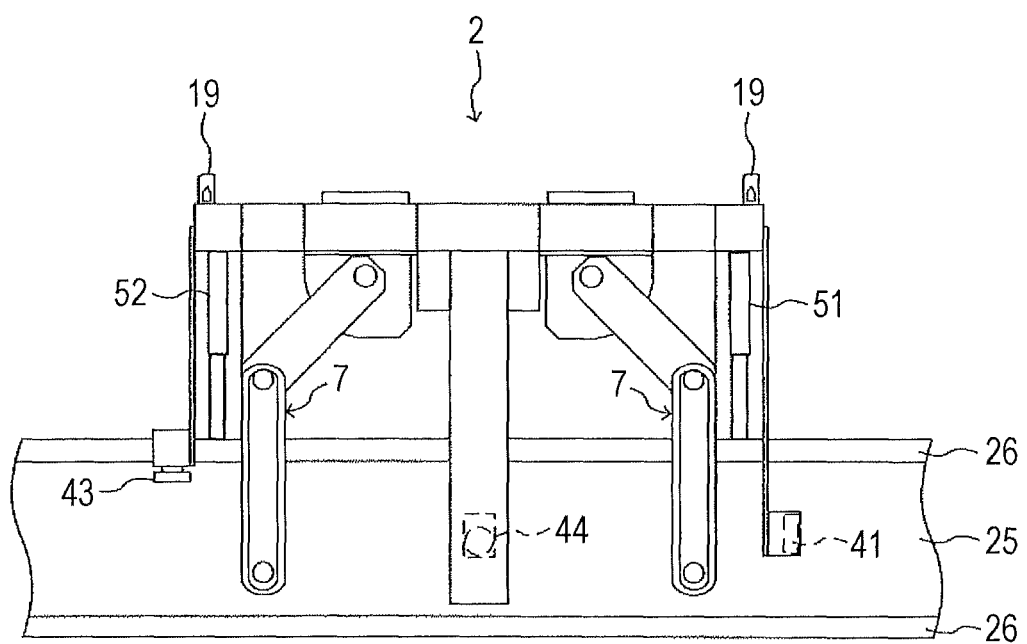
FIG. 14 is a plan view showing an example of the configurations of the robot system and the robot showing another example of the visualizer.

As a visualizer configured to visualize the positional deviation in the Y direction, besides the above electronic devices, rod-like members 51 and 52 (an example of the visualizer) may be used as shown in FIG. 13 and FIG. 14, for example. The rod-like members 51 and 52 may be usually accommodated, for example, as extendable or foldable configurations, and may be protruded only when the position adjustment is performed. The rod-like members 51 and 52 each have a prescribed length, and the positional deviation of the robot 2 in the Y direction from the relative position serving as the reference with respect to the conveyor 3 is visualized depending on whether or not there is a gap between tip ends of the rod-like members 51 and 52 and the conveyor frame 26. As shown in FIG. 13 and FIG. 14, the operator moves the robot 2 so that the tip ends of the rod-like members 51 and 52 are abutted against the conveyor frame 26 of the conveyor 3 and adjusts the distance (interval) between the robot 2 and the conveyor 3 and the inclination in the θ direction of the robot 2. Consequently, the position of the robot 2 in the Y direction with respect to the conveyor 3 can be adjusted.

Although illustration is omitted, the above rod-like members may be installed on the lower surfaces of the frames 47 and 48 (see FIG. 12) and may be used as the visualizer configured to visualize the positional deviation in the Z direction. Also in this case, in the same manner as described above, the operator operates the level adjuster 18 so that the tip ends of the two rod-like members are abutted against the upper surface of the conveyor frame 26 and adjusts the height of the robot 2 and the inclination of the robot 2 with respect to the horizontal direction. Consequently, the position of the robot 2 in the Z direction with respect to the conveyor 3 can be adjusted.

4-2. Other

In the above embodiment, the two irradiators 35 and 38 are installed in the robot 2, and the positions in both the Z direction and the Y direction can be adjusted. However, for example when the position in either the Z direction or the Y direction is required to be adjusted, the corresponding one of the irradiators and the reference mark may be installed.

In the above case, as an example, the robot 2 performs the food serving operation; however, the robot 2 can perform other various operations relating to food production lines, such as cooking, serving, pouring of sauce, packaging, and boxing. In addition to the food field, it is also suitable for fields such as the electric and electronic industries where the product life cycle is short and, for example, model change is repeated every several months. In this case, the robot can perform various operations relating to production lines of product, such as assembly, processing, painting, and welding of parts. In addition, for example, the present invention may be applied to the field of physical distribution, and the robot can perform various operations relating to physical distribution lines such as picking of articles and palletizing.

If terms "vertical," "parallel," "plane," etc. are used in the above description, these terms are not used in the exact meanings thereof. Specifically, these terms "vertical," "parallel," and "plane" allow tolerances and errors in design and producing and have meanings of "approximately vertical," "approximately parallel," and "approximately plane."

If terms "same," "equal," "different," etc. in relation to a dimension and a size of the appearance, a shape, a position, etc. are used in the above description, these terms are not used in the exact meaning thereof. Specifically, these terms "same," "equal," and "different" allow tolerances and errors in design and producing and have meanings of "approximately the same," "approximately equal," and "approximately different."

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A robot comprising:
    an arm via which the robot is configured to perform an operation on a workpiece conveyed in a conveyance direction on a conveyor;
    a first irradiator configured to emit first visible light toward the conveyor in a first direction perpendicular to the conveyance direction such that the first visible light coincides with a second direction mark when a position of the robot in a second direction perpendicular to both the conveyance direction and the first direction is at a second reference position with respect to a position of the conveyor in the second direction and such that the first visible light deviates from the second direction mark when the position of the robot in the second direction deviates from the second reference position;
    a second irradiator configured to emit second visible light toward the conveyor in the second direction such that the second visible light coincides with a first direction mark when a position of the robot in the first direction is at a first reference position with respect to a position of the conveyor in the first direction and such that the second visible light deviates from the first direction mark when the position of the robot in the first direction deviates from the first reference position;

a first adjuster via which the position of the robot in the second direction is adjusted with respect to the position of the conveyor in the second direction such that the first visible light coincides with the second direction mark; and a second adjuster via which the position of the robot in the first direction is adjusted with respect to the position of the conveyor in the first direction such that the second visible light coincides with the first direction mark.

2. The robot according to claim 1, wherein the first adjuster includes a caster provided at a bottom of the robot, the robot being movable via the caster according to the positional deviation.

3. The robot according to claim 1, wherein each of the first visible light and the second visible light has a linear projected shape.

4. The robot according to claim 3, wherein the first irradiator is configured to visualize positional deviation of the robot from the second reference position, and wherein the second irradiator is configured to visualize positional deviation of the robot from the first reference position.

5. The robot according to claim 1, wherein the first direction is a vertical direction.

6. A robot system comprising:
a conveyor configured to convey a workpiece in a conveyance direction;
a robot configured to perform an operation on the workpiece conveyed in the conveyance direction;
a first irradiator configured to emit first visible light toward the conveyor in a first direction perpendicular to the conveyance direction such that the first visible light coincides with a second direction mark when a position of the robot in a second direction perpendicular to both the conveyance direction and the first direction is at a second reference position with respect to a position of the conveyor in the second direction and such that the first visible light deviates from the second direction mark when the position of the robot in the second direction deviates from the second reference position;
a second irradiator configured to emit second visible light toward the conveyor in the second direction such that the second visible light coincides with a first direction mark when a position of the robot in the first direction is at a first reference position with respect to a position of the conveyor in the first direction and such that the second visible light deviates from the first direction mark when the position of the robot in the first direction deviates from the first reference position;
a first adjuster via which the position of the robot in the second direction is adjusted with respect to the position of the conveyor in the second direction such that the first visible light coincides with the second direction mark; and a second adjuster via which the position of the robot in the first direction is adjusted with respect to the position of the conveyor in the first direction such that the second visible light coincides with the first direction mark.

7. The robot system according to claim 6, wherein the first direction is a vertical direction.

8. The robot system according to claim 6, wherein the first irradiator is configured to visualize positional deviation of the robot from the second reference position, and wherein the second irradiator is configured to visualize positional deviation of the robot from the first reference position.

9. A robot position adjustment method comprising:
providing a robot configured to perform an operation on a workpiece conveyed in a conveyance direction on a conveyor;
emitting first visible light toward the conveyor in a first direction perpendicular to the conveyance direction such that the first visible light coincides with a second direction mark when a position of the robot in a second direction perpendicular to both the conveyance direction and the first direction is at a second reference position with respect to a position of the conveyor in the second direction and such that the first visible light deviates from the second direction mark when the position of the robot in the second direction deviates from the second reference position;
emitting second visible light toward the conveyor in the second direction such that the second visible light coincides with a first direction mark when a position of the robot in the first direction is at a first reference position with respect to a position of the conveyor in the first direction and such that the second visible light deviates from the first direction mark when the position of the robot in the first direction deviates from the first reference position;
adjusting the position of the robot in the second direction with respect to the position of the conveyor in the second direction such that the first visible light coincides with the second direction mark; and
adjusting the position of the robot in the first direction with respect to the position of the conveyor in the first direction such that the second visible light coincides with the first direction mark.

10. The robot position adjustment method according to claim 9, wherein the first direction is a vertical direction.

11. The robot position adjustment method according to claim 9, wherein positional deviation of the robot from the second reference position is configured to be visualized, and wherein positional deviation of the robot from the first reference position is configured to be visualized.

* * * * *